3,546,277
METHOD OF PREPARING 1,1-DIALKOXY-4,4-DIACYLOXYBUTANES
Itsutoshi Maeda, Tokyo, and Masahiko Takesada and Ryonosuke Yoshida, Kanagawa-ken, Japan, assignors to Ajinomoto Co., Inc., Tokyo, Japan
No Drawing. Filed Mar. 20, 1967, Ser. No. 624,184
Int. Cl. C07c 67/00
U.S. Cl. 260—491                                    3 Claims

ABSTRACT OF THE DISCLOSURE 1,1-di-lower-alkoxy-4,4-diacyloxybutanes are obtained directly from the corresponding 1,1-diacyloxy-2-propenes by reaction with carbon monoxide, hydrogen, and lower alkanol under the temperature and pressure conditions of the oxo reaction and in the presence of a cobalt-bearing catalyst which is converted to cobalt carbonyl under the reaction conditions. The yields are sharply increased if lower alkyl orthoformates are present in the reaction mixture in a mol ratio of 0.1:1 to 3:1 relative to the diacyloxypropene.

BACKGROUND OF THE INVENTION

This invention relates to the preparation of 1,1-dialkoxy-4,4-diacyloxybutanes from 1,1-dialcyloxy-2-propenes.

The acetals of 4,4-diacyloxybutyraldehyde, or 1,1-dialkoxy-4,4-diacyloxybutanes are useful intermediates in the preparation of tryptophan. The diacyloxy group may be converted to a hydantoin group by Bucherer's reaction, and the phenylhydrazone of the dialkoxypropyl-5-hydantoin so produced may be converted to tryptophan by the method disclosed in Japanese Pat. No. 461,193 (1965).

The 1,1-dialkoxy-4,4-diacyloxybutanes cannot be prepared from 4,4-diacyloxybutyraldehyde by reaction with an alcohol in the presence of an acid, the usual method of making acetals, because the reaction leads to 2,5-dialkoxy-tetrahydrofuran, as disclosed in U.S. Pat. No. 2,920,081. The 4,4-diacyloxybutyraldehyde may be prepared in a known manner by hydroformylation of 1,1-diacyloxy-2-propene with carbon monoxide and hydrogen in the presence of a cobalt carbonyl catalyst, but the aldehyde cannot be recovered economically from the reaction mixture without polymerization or decomposition. The 4,4-diacyloxybutyraldehyde is not a suitable starting material for the afore-described tryptophan synthesis because of the presence of two equally reactive groups, the formyl group and the diacyloxy group.

The object of the invention is the preparation of 1,1-dialkoxy-4,4-diacyloxybutanes by hydroformylation in a single step at high yield, using the readily available 1,1-diacyloxy-2-propenes as starting materials.

SUMMARY OF THE INVENTION

We have found that the hydroformylation of 1,1-diacyloxy-2-propenes with hydrogen and carbon monoxide in the presence of a cobalt carbonyl catalyst leads directly to 1,1-dialkoxy-4,4-diacyloxybutanes if the reaction mixture contains lower alkanols, and that yields closely approaching the theoretical value are possible if the reaction mixture additionally contains lower alkyl orthoformates.

Although cobalt carbonyls are, in effect, acids under the conditions of the oxo or hydroformylation reaction, the reaction of diacylpropenes with carbon monoxide, hydrogen, and alkanol does not produce the expected 2,5-dialkoxytetrahydrofuran in major amounts, and the formation of by-products is practically completely suppressed in the presence of the afore-mentioned alkyl orthoformates.

The 1,1-diacyloxy-2-propenes which we have employed successfully in the preparation of dialkoxy-diacyloxybutanes include diacetoxypropene, dipropionioxypropene, diisopropionoxypropene, dibutyroxypropene, and diisobutyroxypropene. They are obtained in a known manner from acrolein and the anhydrides of the corresponding alkanoic acids at elevated temperature (C. W. Smith et al., JACS 73 (1951) 5285). The alkanols employed in our method include methanol, ethanol, propanol, isopropanol, butanol, and isobutanol. The esters of orthoformic acid with these alcohols are added to the reaction mixture for highest yields in amounts of 0.1 to 3 mols per mol of 1,1-diacyloxy-2-propene, with best results usually being obtained at a mol ratio between 0.8:1 and 1:5:1.

The cobalt carbonyl catalysts in the method of the invention are those commonly employed for the oxo reaction. They include dicobalt octacarbonyl, cobalt hydrocarbonyl, finely divided cobalt metal and cobalt compounds which are converted to carbonyl under the reaction conditions, such as cobalt naphthenate, cobalt hydroxide, and cobalt acetate, as is well known. The cobalt concentration in the reaction mixture may range from about 0.5 to about 5 g./l., values between 2 and 4 g./l. being generally preferred.

Carbon monoxide and hydrogen enter the hydroformylation reaction in equimolecular amounts, and an excess of hydrogen is usually employed, the conventional range of composition of the gaseous reactants being one to two mols hydrogen per mol carbon monoxide. The reaction temperature is generally 50° to 200° C., and the pressure between 100 and 300 kg./cm.$^2$. The time required for complete conversion of the diacyloxypropene depends on the other process variables, and these variables are preferably chosen in such a manner that the reaction time is between 30 minutes and a few hours.

The 1,1-alkoxy-4,4-diacyloxybutanes are readily recovered from the reaction mixture. The catalyst is first inactivated by decomposition, precipitation, or oxidation, and the desired product may be separated from other components of the mixture by fractionation in a vacuum because of its high boiling point. It may also be isolated from accompanying by-products and starting materials by selective solvent extraction.

The yield is 70% or better if the reaction mixture contains lower-alkyl orthoformates, and the 1,1-dialkoxy-4,4-diacyloxybutane is accompanied only by minor amounts of the isomeric 1,1-di-alkoxy-2-methyl-3,3-diacyloxypropane.

DESCRIPTION OF PREFERRED EMBODIMENTS

The following examples further illustrate the method of the invention, but it will be understood that the invention is not limited thereto.

EXAMPLE 1

0.1 mol (15.8 g.) batches of 1,1-diacetoxy-2-propene, sufficient dicobalt octacarbonyl in ethanol solution to make the Co concentration of the reaction mixture 2 or 4 g./l., and enough ethyl orthoformate to make the total volume 50 ml. were mixed and placed in a 100 ml. steel autoclave, the specific proportions employed in five successive runs and other process data being listed in Table 1 hereinbelow.

A mixture of carbon monoxide with one or two volumes hydrogen was pumped into the autoclave until the pressure reached 180 kg./cm.$^2$. The autoclave was then heated to 110° or 130° C. until the internal gas pressure reached a constant minimum. It was then cooled, excess gas was released, and triphenylphosphine was added to the reaction mixture to destroy the cobalt catalyst. The contents of the autoclave were then filtered and diluted with ethyl formate to 100 ml.

The solutions so obtained in the five runs were analyzed by gas chromotography at 150° C. at a flow rate of 75 ml./min. of helium as a carrier. A two meter column of 5% polyethyleneglycol 4000 on Chromsorb T was employed, and diethyladipate was used as an internal standard. The results obtained are listed in the table.

TABLE 1

| Run No. | Temp., °C. | Co, g./l. | $H_2$:CO | Ethyl formate, ml. | Yield, percent (A) | (B) |
|---|---|---|---|---|---|---|
| 1 | 130 | 2 | 1:1 | 26 | 86.6 | 2.6 |
| 2 | 130 | 2 | 2:1 | 20 | 79.8 | 3.3 |
| 3 | 110 | 4 | 1:1 | 17 | 82.2 | 4.5 |
| 4 | 110 | 2 | 1:1 | 26 | 81.5 | 7.4 |
| 5 | 110 | 2 | 2:1 | 26 | 81.0 | 5.4 |

NOTES.—(A) 1,1-diethoxy-4,4-diacetoxybutane. (B) 1,1-diethoxy-2-methyl-3,3-diacetoxypropane.

EXAMPLE 2

0.5 mol (79 g.) 1,1-diacetoxyl-2-propene, 45 ml. of a solution of dicobalt octacarbonyl in ethanol bringing the catalyst concentration in the reaction mixture to 2 g./l. Co, and 130 ml. ethyl orthoformate were placed in a 500 ml. stainless steel autoclave, and enough of a mixture of equal volumes of carbon monoxide and hydrogen was admitted to raise the pressure to 180 kg./cm.$^2$. The temperature was kept at 110° C. until the internal pressure of the autoclave reached a stable minimum. The catalyst was then decomposed with triphenylphosphine, as described in Example 1, and the decomposition products were removed by filtration.

The excess of ethyl formate was distilled from the filtrate in a vacuum, and two fractions were recovered from the residue by distillation. The fraction boiling at 60 to 123° C. at 5 mm. Hg weighed 6.2 g., and was found by gas chromatography to contain 1.5 g. 1,1-diacetoxypropane, 0.2 g. 1,1-diethoxy-2-methyl-3,3-diacetoxypropane, and 3.0 g. 1,1-diethoxy-4,4-diacetoxybutane. The fraction boiling between 123 and 128° C. at 5 mm. Hg weighed 96.8 g. and consisted of 90.2 g. 1,1-diethoxy-4,4-diacetoxybutane and 6.6 g. 1,1-diethoxy-2-methyl-3,3-diacetoxypropane.

The composition of the higher boiling fraction was confirmed by elementary analysis:
Calcd. for $C_{12}H_{22}O_6$ (percent): C, 54.9; H, 8.45. Found (percent): C, 55.03; H, 8.50.

EXAMPLE 3

0.5 mol (79 g.) 1,1-diacetoxy-2-propene, 68 ml. of a solution of dicobalt octacarbonyl in alcohol (2 g./l. Co), 82 ml. methyl orthoformate, and 26 ml. methanol were contacted in a 500 ml. stainless steel autoclave with a mixture of carbon monoxide and hydrogen, 1:1, at an initial pressure of 200 kg./cm.$^2$ at 130° C. until gas adsorption stopped. The catalyst was then removed as described above, and unreacted methanol and methyl orthoformate were recovered by vacuum distillation.

The residue contained 82.1 g. 1,1-dimethoxy-4,4-diacetoxy-butane boiling at 119–121° C. at 5 mm. Hg. The yield was 70.2%.

EXAMPLE 4

The importance of the orthoformate for the high yields obtained in the preceding examples is evident from Table II which lists operating conditions and results of nine runs in which one mol of a 1,1-diacyloxy-2-propene $CH_2\!=\!CH\!-\!CH\!=\!(OOC.R)_2$ was reacted with equal volumes of carbon monoxide and hydrogen at an initial pressure of 200 kg./cm.$^2$ in a 100 ml. autoclave in the presence of enough dicobalt octacarbonyl to make the cobalt concentration of the reaction mixture 2 or 4 g./l. and enough of a lower alkanol R′OH to make the total liquid volume 50 ml. A temperature of 110° C. was maintained in all runs for 75 minutes, a period sufficient for maximum absorption of the gas.

The catalyst was removed from the reaction mixture by decomposition with triphenylphosphine and filtration, and the unreacted lower alkanol was removed by vacuum distillation. The residue was fractionated, and the fraction containing the 1,1-dialkoxy-4,4-diacyloxybutane was recovered.

Table II lists, for each run, the specific nature of the afore-mentioned radicals R,R′ in the acyloxy and alkyl groups of the diacyloxypropene and of the alkanol employed as starting materials, the cobalt concentration in the reaction mixture, the percentage yield calculated under the assumption that the recovered fraction consists entirely of 1,1-dialkyloxy-4,4-diacyloxybutane, the boiling point and refractive index of the recovered fraction, and, for four representative runs, the percentage of n-butane and methylpropane derivative found in the fraction by nuclear magnetic resonance spectra. These derivatives were further identified by elementary analysis.

As is evident from Table II, the exact nature of R and R′ is immaterial when the hydroformylation is carried out in the absence of orthoformate. The same compounds were obtained in the high yields illustrated in Examples 1 to 3, when the alkanols R′OH were supplemented by the corresponding orthoformates $HC(OR')_3$.

TABLE II

| Run No. | R | R′ | Co, g./l. | Yield, percent | Recovered fraction Boiling point | Refractive index | Elementary analysis Calc. | Found | Percent A′ | Percent B′ |
|---|---|---|---|---|---|---|---|---|---|---|
| 1 | $CH_3$– | $CH_3$– | 4 | 44.6 | 119–121° C./5 mm. Hg. | $\eta_D^{21}$ 1.4279 | C, 51.27 / H, 7.75 | 51.60 / 7.75 | 89.7 | 4.8 |
| 2 | $CH_3$– | $C_2H_5$ | 2 | 37.0 | 125–128° C./4 mm. Hg. | $\eta_D^{19}$ 1.4271 | C, 54.95 / H, 8.45 | 55.08 / 8.53 | 93.0 | 4.0 |
| 3 | $CH_3$– | $i$-$C_3H_7$– | 3 | 34.8 | 130–132° C./3 mm. Hg. | $\eta_D^{19}$ 1.4285 | C, 57.91 / H, 9.03 | 57.53 / 9.08 | | |
| 4 | $CH_3$– | $C_4H_9$– | 3 | 41.6 | 160–163° C./3 mm. Hg. | $\eta_D^{22}$ 1.4350 | C, 60.35 / H, 9.50 | 60.94 / 9.97 | | |
| 5 | $C_2H_5$ | $CH_3$– | 3 | 36.2 | 128–130° C./3 mm. Hg. | $\eta_D^{20}$ 1.4310 | C, 54.95 / H, 8.45 | 55.01 / 8.34 | 83.7 | 2.8 |
| 6 | $C_2H_5$ | $C_2H_5$ | 3 | 40.0 | 137–139° C./3 mm. Hg. | $\eta_D^{21}$ 1.4295 | C, 57.91 / H, 9.03 | 57.50 / 9.00 | | |
| 7 | $C_2H_5$ | $C_4H_9$– | 3 | 46.3 | 160° C./1 mm. Hg. | $\eta_D^{22}$ 1.4420 | C, 62.40 / H, 9.89 | 62.38 / 9.76 | | |
| 8 | $C_3H_7$ | $CH_3$– | 3 | 40.3 | 142–143° C./2 mm. Hg. | $\eta_D^{19}$ 1.4338 | C, 57.91 / H, 9.03 | 57.71 / 8.97 | 100 | 0 |
| 9 | $C_3H_7$ | $C_2H_5$ | 3 | 49.4 | 153–156° C./3 mm. Hg. | $\eta_D^{21}$ 1.4333 | C, 60.35 / H, 9.50 | 60.81 / 9.52 | | |

A′: 1,1-diacyloxy-4,4-dialkyloxybutane.
B′: 1,1-diacyloxy-2-methyl-3,3-dialkyloxypropane.

What we claim is:
1. A method of preparing a 1,1-dialkoxy-4,4-diacyloxy-butane of the formula

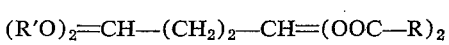
$(R'O)_2\!=\!CH\!-\!(CH_2)_2\!-\!CH\!=\!(OOC\!-\!R)_2$ which comprises:
(a) reacting a 1,1-diacyloxy-2-propene of the formula $CH_2\!=\!CH\!-\!CH\!=\!(OOC\!-\!R)_2$ with an alkanol of the formula R′OH, carbon monoxide and hydrogen in the presence of a cobalt carbonyl at 50°–200° C. and 100–300 kg./cm.$^2$ until said dialkoxy-diacyloxybutane is formed; and (b) recovering said dialkoxy-diacyloxybutane from the reaction mixture, (1) in said formulas, R and R′ being lower alkyl.

2. A method as set forth in claim 1, wherein said diacyloxypropene is reacted with said alkanol, said carbon monoxide, and said hydrogen in the presence of a lower-alkyl orthoformate.

3. A method as set forth in claim 2, wherein the mol ratio of said orthoformate to said diacyloxypropane is between 0.1:1 and 3:1.

References Cited

UNITED STATES PATENTS

| 2,497,303 | 2/1950 | Gresham et al. | 260—491 |
| 3,287,400 | 11/1966 | Hagemeyer et al. | 260—491 |
| 3,381,038 | 4/1968 | Marbet | 260—615 |

LORRAINE A. WEINBERGER, Primary Examiner

V. GARNER, Assistant Examiner

U.S. Cl. X.R.

260—309.7, 326.14, 347.8